United States Patent [19]

Steigelman

[11] 3,871,926

[45] Mar. 18, 1975

[54] PROCESS FOR PRODUCING A COMPOSITE METALLIC ARTICLE

[75] Inventor: James Q. Steigelman, Athens, Pa.

[73] Assignee: W. M. Chace Company, Detroit, Mich.

[22] Filed: Feb. 4, 1974

[21] Appl. No.: 439,221

Related U.S. Application Data

[60] Continuation of Ser. No. 303,195, Nov. 2, 1972, abandoned, which is a division of Ser. No. 138,779, April 29, 1971, abandoned.

[52] U.S. Cl. ............... 148/12 E, 29/527.2, 148/127
[51] Int. Cl. .............................................. B23p 3/10
[58] Field of Search .......... 148/12 E, 127; 29/527.2, 29/527.4

[56] References Cited
UNITED STATES PATENTS

| | | | |
|---|---|---|---|
| 2,267,342 | 12/1941 | Schwartz | 29/527.4 |
| 2,718,690 | 9/1955 | Ulam | 29/471.5 |
| 2,845,365 | 7/1958 | Harris | 29/527.7 X |
| 3,173,813 | 3/1965 | Dewey et al. | 148/127 |
| 3,224,088 | 12/1965 | McNelly | 29/527.4 X |
| 3,615,290 | 10/1971 | Talento | 148/127 |
| 3,652,344 | 3/1972 | Kingsbury | 148/127 |

*Primary Examiner*—W. Stallard
*Attorney, Agent, or Firm*—Norman J. O'Malley; Donald R. Castle; John C. Fox

[57] ABSTRACT

A process is disclosed for producing a composite strip consisting essentially of a stainless steel layer and a brazing alloy layer metallurgically bonded together along a common interface. The process comprises heating under pressure a package consisting of a plate of stainless steel and a plate of the primary brazing alloy containing a thin foil of a second brazing alloy at the mutual interface of the stainless steel and primary brazing alloy to a temperature above the melting point of the second brazing alloy but below the melting point of the primary brazing alloy and below the recommended hot working temperature of the stainless steel, lowering the temperature of the package while still under pressure below the melting point of the second brazing alloy, removing the pressure and further lowering the temperature of the now bonded package below 900°F and above the martensitic transformation temperature, reducing the thickness of the package to a strip at temperatures above the martensitic transformation, and cooling the strip to ambient temperature.

Alternatively, the process can comprise heating the steel alone to a temperature above its recommended solution heat treatment temperature, lowering the temperature to slightly above the melting point of the primary brazing alloy, applying under pressure a plate of the primary brazing alloy without the second lower melting brazing alloy lowering the temperature of the package under pressure after partial melting of the brazing alloy at the interface below the melting point of the brazing alloy, removing the pressure and further lowering the temperature of the new bonded package below 900°F and above the martensitic transformation temperature, reducing the thickness of the package to a strip at temperatures above the martensitic transformation, and cooling the strip to ambient temperature.

8 Claims, No Drawings

3,871,926

PROCESS FOR PRODUCING A COMPOSITE METALLIC ARTICLE

CROSS REFERENCE TO RELATED APPLICATIONS

This application is a continuation of Ser. No. 303,195, filed Nov. 2, 1972, and now abandoned which was a division of Ser. No. 138,779, filed Apr. 29, 1971, and now abandoned. The Assignment was recorded on Apr. 29, 1971 on Reel 2733 and Frame 065.

BACKGROUND OF THE INVENTION

Field of the Invention

This invention relates to stainless steel alloys clad with brazing alloys. More particularly, it relates to articles and processes for producing specific composites of stainless steel and brazing alloys in strip form.

Stainless steel alloys that are martensitic at room temperature have certain advantageous properties. The precipitation hardened martensitic stainless steels have properties which make them very advantageous for certain applications such as jet engine parts, heat exchangers and certain honeycomb structures. One of the significant problems of fabrication of shaped articles from such alloys is that brazing alloys in the form of foil or wire have to be inserted between the stainless steel alloy and the metal to which the stainless steel alloy is to be bonded. The three components of stainless steel alloys, the brazing alloy and the metal are aligned and heated to at or near the melting point of the brazing alloy resulting in relatively high assembly costs.

Although it is known to clad steels with brazing alloys, cladding to martensitic stainless steels with certain brazing alloys is not believed to be known. Martensitic stainless steels are difficult to form into shapes, thus if cladding is done by conventional means the clad material cannot be readily shaped by cold metal working techniques. Recommended hot rolling temperatures for certain stainless steels are above the melting point of most brazing alloys. Hot working at temperatures below this temperature often results in cracking.

It is believed, therefore, a shaped article of a martensitic stainless steel clad with a brazing alloy having a melting point below the temperature recommended for hot rolling would be an advancement in the art. It is also believed a process for producing a relatively thin stainless steel strip clad with a brazing alloy from relatively thick stock of stainless steel would be an advancement in the art.

OBJECTS AND SUMMARY OF THE INVENTION

It is an object of this invention to provide a laminate of a martensitic stainless steel and a brazing alloy having a melting point below recommended hot working temperature of the stainless steel.

It is a further object of this invention to provide a process for producing relatively thin stainless steel strip clad with certain brazing alloys from a relatively thick stainless steel stock.

It is an additional object of this invention to provide a process for producing relatively thin laminate of a precipitation hardened martensitic stainless steel and certain brazing alloys having melting points below the recommended hot working temperature.

In accordance with one aspect of the invention, there is provided a process which comprises forming a laminated package by inserting a thin foil of a secondary brazing alloy between the interfaces of a stainless steel alloy plate and a plate of a primary brazing alloy, heating the laminated package to a predetermined temperature while under pressure. The primary brazing alloy has a higher melting point than the secondary brazing alloy, thus, the predetermined temperature is above the melting point of the secondary brazing alloy and below the melting point of the primary brazing alloy and below the recommended hot working temperature of the stainless steel alloy. Thereafter, the temperature is lowered to below the melting point of the second brazing alloy while the package is still under pressure. The pressure is removed and the temperature of the now bonded package is lowered below 900°F, but above the martensitic transformation temperature. Thereafter, the package is reduced in thickness to a strip at temperatures above martensitic transformation temperature and finally the strip is cooled to ambient temperatures.

In accordance with another aspect of this invention there is provided a process comprising heating a relatively thick layer of stainless steel alloy to a first temperature sufficient to cause solution treatment, cooling the alloy to a second temperature that is from about 50°F to about 200°F below the first temperature, applying a layer of a brazing alloy to at least one major surface of the stainless steel while at the second temperature to achieve a bond along a common interface, cooling the resulting laminate to a third temperature below 900°F and above the martensitic conversion temperature, reducing the thickness of the laminate while at the third temperature to produce a strip and cooling the strip to ambient temperature phase.

DETAILED DESCRIPTION OF THE PREFERRED EMBODIMENTS

For a better understanding of the present invention, together with other and further objects, advantages and capabilities thereof, reference is made to the following disclosure and appended claims in connection with the above description of some of the aspects of the invention.

Laminates of stainless steels and other alloys are generally prepared by hot rolling to form a laminate of the two materials. Proper metallurgical bonding of the alloy with the stainless steel occurs. With martensitic stainless steels the foregoing method is not practical since temperatures required to achieve bonding without melting of many alloys with the stainless steel is not high enough to allow hot working within the recommended range of temperatures. Such steels remain extremely difficult to roll without severe cracking. The brazing alloys have melting points below the recommended hot rolling temperatures. By practicing certain concepts within this invention a laminate consisting of a martensitic stainless steel and certain brazing alloys is provided. Additional process concepts can be used to provide a laminate strip of essentially any stainless steel and a brazing alloy from larger thickness material. The advantages of the process of this invention are more fully realized when laminates consisting of martensitic stainless steels and brazing alloys are provided. Major advantages are realized when laminates consisting essentially of a precipitation hardened martensitic stainless steel and a brazing alloy having a melting point below about 1800°F is provided.

Martensitic stainless steels are the steel alloys containing chromium as the major alloying element and are generally classified as the 400 series. Precipitation hardened stainless steels such as 17-4 PH, are aged by heating at temperatures of from about 900° to about 1150°F to achieve precipitation of certain metals at the grain boundaries to achieve certain desired structural properties.

The martensitic phase of stainless steels is formed upon cooling to below about 300°F. It is necessary to heat the steel above about 1900°F to achieve any metal working, such as rolling, without metal damage. Upon cooling, the steel remains in the austenitic phase until it reaches a temperature below about 300°F. As can be appreciated, conventional application of a brazing alloy to form a laminate is virtually impossible since most of the brazing alloys melt at temperatures below about 1900°F. If alloys were applied to a martensitic steel and the temperature was raised above 1900°F for hot rolling, the alloy would melt.

The process of this invention provides for the manufacture of a composite strip as generally defined in Metals Handbooks as being products less than 0.185 inches thick and less than 24 inches wide. These strips are produced from thicknesses above 0.1875 inches and generally above about 0.5 inches. The brazing alloy has a melting point below about 1800°F or at least 50°F below the temperature at which the martensitic steel is recommended for hot rolling. A typical brazing alloy is about 67% by weight copper, 24% by weight manganese and 9% by weight nickel. Other brazing alloys for heat-resistant stainless steel alloys having the desired melting points are known in the art. All that is necessary is that the alloy has a melting point below about 1850°F and will metallurgically bond with a martensitic stainless steel.

The thick stock such as a 1 inch thick plate of martensitic stainless steel is heated to about 100°F below the melting point of the desired brazing alloy. A thin strip generally less than 10 mils thickness of another brazing alloy having a lower melting point than the desired alloy is placed between the thick stainless steel and the desired brazing alloy. The material is held at the temperature for about 2 to 4 hours and then raised to about 30° to 60°F below the melting point of the desired brazing alloy to achieve a laminate of the brazing alloy to the stainless steel. The bond will subsequently be improved upon rolling at lower temperatures.

The laminate is cooled to between 300°F and 900°F because at temperatures above 900°F the precipitation of chromium carbides can occur and cause subsequent intergranular corrosion in the stainless steel. A temperature range of from about 650°F to 900°F is preferred. Temperatures below about 300°F are to be avoided since martensite transformation occurs. The laminate is reduced to the desired thickness of strip without cracking which would occur at intermediate temperatures by conventional means such as rolling. Preferred thicknesses are generally from about 0.02 inches to about 0.15 inches with thickness of from about 0.08 to about 0.10 inches being especially preferred.

Alternatively, the process can comprise heating the steel alone to a temperature above its recommended solution heat treatment temperature, lowering the temperature to slightly above the melting point of the primary brazing alloy, applying under pressure a plate of the primary brazing alloy without the second lower melting brazing alloy, lowering the temperature of the package under pressure after partial melting of the brazing alloy, removing the pressure and further lowering the temperature of the now bonded package below 900°F and above the martensitic transformation temperature, reducing the thickness of the package to a strip at temperature above the martensitic transformation, and cooling the strip to ambient temperature.

While the foregoing process has been described in relation to the use of martensitic stainless steel, the process is not so limited. The process can be applied to any stainless steel thus offering an alternative method from those known in the prior art. Thus, if desired the stainless steel can be austenitic, ferritic or martensitic as well as the various precipitation hardened stainless steels.

While there have been described what are at present considered the preferred embodiments of the invention, it will be obvious to those skilled in the art that various changes and modifications may be made therein without departing from the scope of the invention as defined by the appended claims.

What is claimed is:

1. A process for producing a strip of laminated material comprising:
   a. heating a relatively thick layer of a stainless steel alloy to a first temperature sufficient to solution treat the stainless steel alloy,
   b. cooling said alloy to a second temperature from about 50°F to about 200°F below said first temperature,
   c. applying a layer of a brazing alloy to one surface of said stainless steel to achieve a bond along a common interface,
   d. cooling the resulting laminate to a third temperature below about 900°F and above the martensitic transformation temperature,
   e. reducing the thickness of the laminate while at said third temperature to produce a strip and
   f. cooling said strip to ambient temperature.

2. A process according to claim 1 wherein the original thickness of said stainless steel is greater than about 0.5 inches.

3. A process according to claim 2 wherein said first temperature is above about 1900°F, said second temperature is from about 1700°F to about 1850°F and said third temperature is from about 300°F to about 900°F.

4. A process according to claim 3 wherein said stainless steel is a martensitic stainless steel.

5. A process according to claim 4 wherein said stainless steel is a precipitation hardened stainless steel.

6. A process for producing a strip of laminated materials comprising:
   forming a laminated package consisting essentially of a plate of a stainless steel alloy, a primary brazing alloy and a thin foil of a secondary brazing alloy between the interfaces of said stainless steel alloy plate and said primary brazing alloy plate by inserting said foil between said interfaces,
   heating said package to a predetermined temperature above the melting point of the secondary brazing alloy and below the melting point of the primary brazing alloy and below the recommended hot working temperature of the stainless steel alloy while said package is under pressure, lowering the temperature of the package, while still under pressure to below the melting point of the secondary alloy, removing the pressure and further lowering the temperature of the now bonded package below about 900°F and above the martensitic transformation temperature, reducing the thickness of the package to a strip at temperatures above the martensitic transformation, and cooling the strip to ambient temperature.

7. A process according to claim 6 wherein said secondary brazing alloy has a melting point below about 1800°F and said primary brazing alloy has a melting point below about 1900°F.

8. A process according to claim 7 wherein said stainless steel is a martensitic stainless steel.

* * * * *